Figure 1:
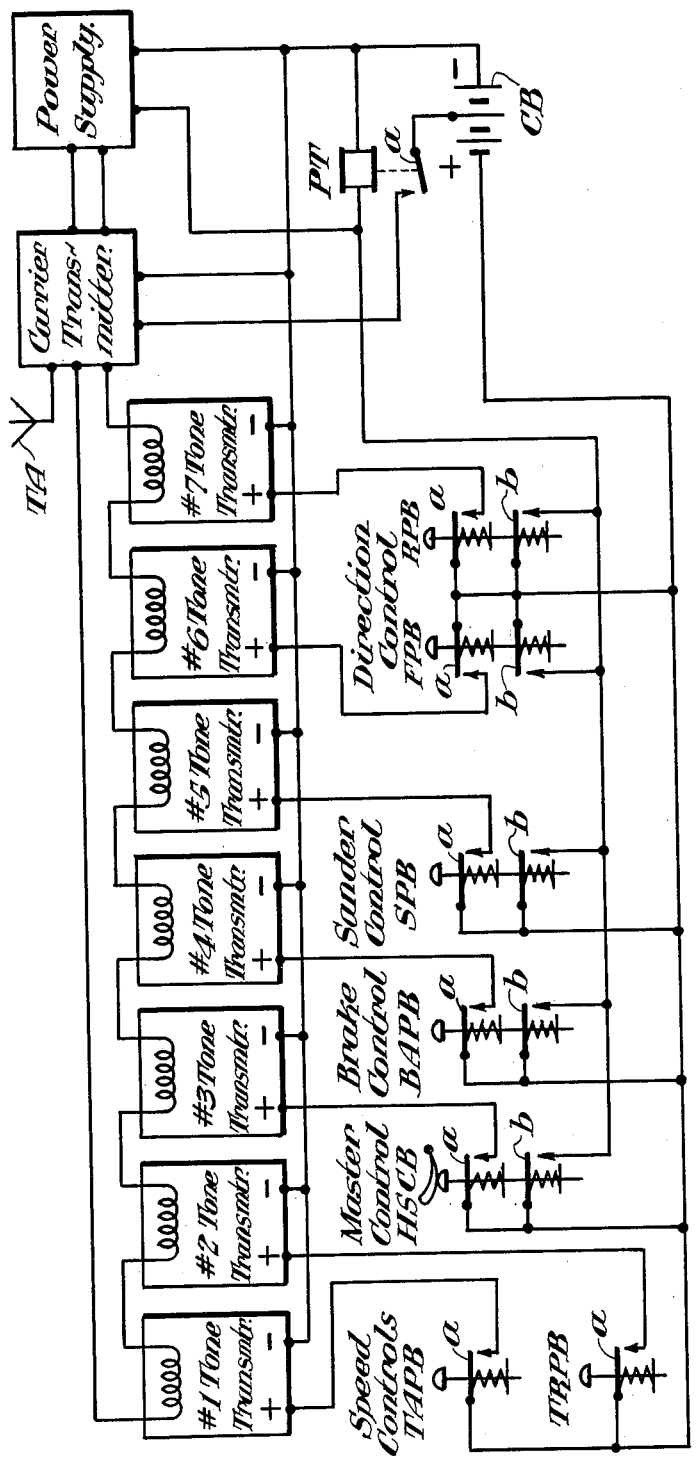

July 2, 1963

L. R. ALLISON 3,096,056

LOCOMOTIVE REMOTE CONTROL SYSTEM

Filed Jan. 25, 1961

2 Sheets-Sheet 1

INVENTOR.
Leslie R. Allison.
BY W. H. Stout.
HIS ATTORNEY

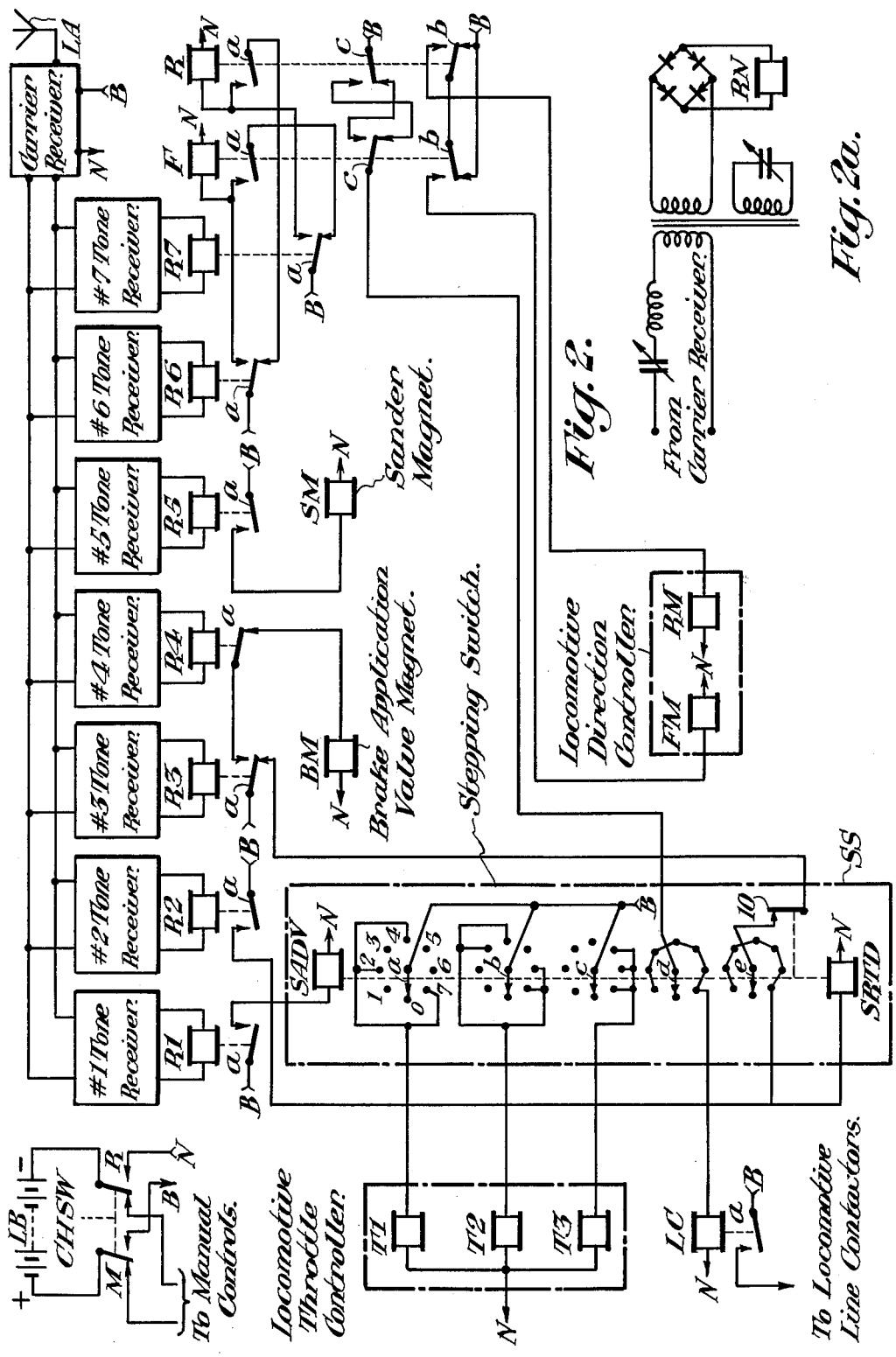

3,096,056
LOCOMOTIVE REMOTE CONTROL SYSTEM
Leslie R. Allison, Forest Hills, Pa., assignor to Westinghouse Air Brake Company, Wilmerding, Pa., a corporation of Pennsylvania
Filed Jan. 25, 1961, Ser. No. 84,929
6 Claims. (Cl. 246—187)

My invention pertains to a remote control system for railway locomotives. More particularly, my invention pertains to a control system by which a single operator may control the movement and operation of a locomotive in switching or similar type service from a position on the ground nearby the locomotive or from a position in a control tower.

The operation of a switching locomotive often becomes quite routine, with its movements being repetitive in nature. This is especially true of industrial switchers where the locomotive moves within the confines of an industrial plant. These movements are often quite short in distance and within a restricted area. Under other conditions, the locomotive operation repeats over and over a similar movement as cars are brought from a nearby storage location for emptying or filling at a particular point. One man is thus capable of handling the operation of not only the locomotive but also the switches, coupling, and other similar apparatus under these conditions. It is obviously of considerable advantage to be able to control such switching operations with only a single crewman who at the same time is the locomotive operator and the ground crew. This single individual may, in other situations, by an operator located in a control tower handling a coal dumper, sintering plant, or similar apparatus in addition to controlling the locomotive movements. Furthermore, industrial locomotives in some locations must operate in areas which are extremely hazardous for the crew, for example, areas having extreme heat or high level nuclear radiation. Remote control of locomotives operating under these conditions eliminates all such low safety factors.

Such a remote control system for switching locomotives promotes economy in that only one worker comprises the entire crew. The system also improves the operation since a single individual controls the movements and other operations and there is no lost motion. Even under ordinary conditions, improved safety is provided since, with only one man, there can be no misunderstanding between crew members as to what operation will next occur. Finally, when hazardous conditions exist, remote control of the operation removes all crew members from the hazard area.

Accordingly, it is an object of my invention to provide a remote control system for locomotives.

It is also an object of my invention to provide a remote control system by which a single operator, remotely located, may control the operation of a locomotive.

A further object of my invention is a locomotive control system by which a remotely located operator can control the movements and operations of the locomotive without necessarily being on, or immediately adjacent to, that locomotive.

Another object of my invention is a remote control system for a locomotive which must operate in a hazardous environment which adversely affects the safety of any crew on board the locomotive.

Still another object of my invention is a control system for switching locomotives by which a single operator can control all operations from his position on the ground away from the locomotive cab.

A still further object of my invention is a system for communicating and executing, from a remote location, all the desired controls and movements of a switching locomotive.

A further object of my invention is a remote control system for locomotives in which any loss of control by the remotely located operator, as the result of a mishap to him or a system fault, automatically results in an immediate stopping of all locomotive movement.

Other objects, advantages, and features of my invention will become apparent from the following specification and appended claims when taken in connection with the accompanying drawings.

I shall now described the various features of the apparatus and its operation and shall then point out the novel features thereof in the appended claims.

In practicing my invention, I provide a communication channel between the remote control location and the locomotive to be controlled. In the accompanying drawings, this is shown as being a radio circuit with a carrier current channel capable of carrying several voice frequency or other low frequency carrier tones. However, this transmission or communication channel may also be an inductive carrier channel, sometimes called "wired radio," which is well known in the railroad communication field. The channel used is essentially a single-direction transmission means, i.e., control station to locomotive, as no answer-back is necessary. At the remote control location, the apparatus may either be permanently situated in a control tower or may be a pack set carried by the operator. In either case, the system provides the various control devices and communication apparatus necessary for controlling the locomotive. These control devices may be push button switches, toggle switches, levers, or similar apparatus. At this control location, the system also includes a carrier transmitter, which provides the basic circuit over the communication channel, and the tone transmitters for the control functions to be transmitted to the locomotive. One of the control switches or devices is associated with each of the selected tone transmitters. Although the system here shown uses one tone for each control function, it may be preferable in some installations to use combinations of the available tones for some of the control functions. Various functions are controlled including the speed, brakes, the direction in which the locomotive will move, and such miscellaneous apparatus as sanders, bells, and whistles. The speed control is specifically shown and described in this application as obtained through advancing or retarding the throttle one step at a time. However, it is to be understood that, in other arrangements, specific speed levels may be chosen and transmitted as specific functions. In addition, a so-called dead-man control is provided, particularly for the portable control system, which assures that the operator must be in full control of the locomotive at all times in order for locomotive movement and operation to occur. This is a safety feature which, from a practical standpoint, is a necessity in systems of this type.

On the locomotive, my system provides a carrier receiver for the basic carrier frequency circuit and a tone receiver for each tone provided in the system. Each tone receiver acts to energize an associated relay when carrier current of that particular tone frequency is received over the communication channel. For the more simple controls, such as sanding, whistle, and bell, the tone receiver relay directly controls a magnet valve or other device which in turn tcontrols that operation or function. The control of the locomotive brakes through the brake magnet valve is similar to the simple controls with the exception that a check of the dead-man control is inserted in series with the normal brake control apparatus. The presently described system causes an application of the locomotive brakes as a result of the presence of the selected carrier tone frequency for that function. In addition, a check for the presence of the dead-man control tone frequency is made prior to the release of the brakes and to retain them released. The two possible directions of movement of the locomotive are each selected by a particular tone frequency with intercircuit checks to eliminate the possibility that both directions may inadvertently be selected at the same time.

The speed of the locomotive in the selected direction of movement is controlled through a reversible stepping switch, located on the locomotive, which changes the selected speed one step at a time. This is accomplished by advancing or retarding the position of the locomotive throttle through an intermediate control by a group of throttle control magnets. These control magnets are energized in various combinations, to select throttle positions, as the stepping switch moves through its contact positions. Each direction of movement of the stepping switch is selected by a different tone frequency. That is, one tone advances the stepping switch, and thus the throttle, one step at a time and a different tone causes the stepping switch to reverse its movement, and thus the throttle to be retarded, one step at a time. In addition, a check is made that the dead-man control tone frequency is being received to assure full control and alertness by the remote operator before any speed can be selected. In the event that the dead-man control frequency is not received, the stepping switch automatically returns to its home or off position through a self-stepping control circuit.

In the accompanying drawings, FIG. 1 is a partly conventional, partly diagrammatic showing of a circuit arrangement and the apparatus at the control location for one form of my invention.

Figure 1A:
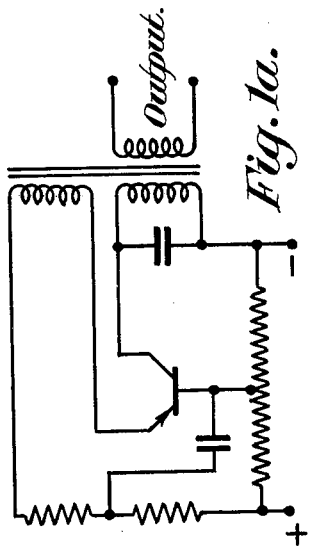

FIG. 1a is a circuit drawing of a typical tone transmitter which may be used in the arrangement of FIG. 1.

In FIG. 2, the locomotive apparatus and the circuit arrangement necessary for cooperation with the arrangement in FIG. 1 is illustrated, again in a partly conventional, partly diagrammatic manner.

A typical circuit for a tone receiver is shown in FIG. 2a which may be used for the tone receivers conventionally shown in FIG. 2.

In each of the drawings, similar references designate similar parts of the apparatus. Throughout these drawings, conventional symbols have been used which are easily understood and need no special explanation here.

Referring now to the control location or station in FIG. 1, in the upper right of this illustration is shown the carrier transmitter and associated power supply which provides the basic carrier current circuit for communication between the control location and the controlled locomotive. As previously mentioned, it is here assumed that communication is by a space radio channel, the carrier being transmitted by the associated transmitting antenna TA shown connected to the carrier transmitter. It is further assumed that the control station shown is of the portable type so that a self contained power supply is needed for the carrier transmitter. This power supply, shown conventionally by block diagram, may be any well known type of converter which will provide a relatively high voltage output as a result of a relatively low voltage input. Since the use and design of such converters is conventional and well known, the details are not here shown as they form no part of my invention. The low voltage power is supplied from the battery CB which is connected to the power supply apparatus over contacts of the various control switches, shown as spring-return push buttons, of the control apparatus. The power transfer relay PT is also energized when any one of these same circuits is completed. When relay PT is energized and picks up to close its front contact a, a low voltage is supplied to the carrier transmitter for filament heating and similar requirements, all of which is well known in the art. It is to be understood, of course, that if, as previously mentioned, a different type of communication channel such as an inductive carrier circuit is used, the carrier transmitter selected will be one appropriate for such type channel. Operation, however, is similar to that described hereinafter and the modifications necessary are well known. If a fixed control location such as a control tower is used, the power supply may possibly be eliminated in favor of the commercial power supply. Such modifications as are necessary to substitute different communication channels and power supplies, these being well known in the art, are included in my invention.

Across the top of FIG. 1, shown in conventional block form, are seven low frequency tone transmitters. Each produces, when energized, a different carrier current or tone of a frequency level that may be used to modulate the basic carrier current transmitted by the carrier transmitter over the channel in use. It is to be understood, of course, that more or less than seven transmitters may be used in a particular installation, seven being used here for the purpose of illustrating the various types of control functions that may be transmitted. These tone transmitters may be formed of a typical transistorized circuit as shown in FIG. 1a. Obviously this circuit is a simple transistor oscillator with an output winding on the feedback transformer. This oscillator circuit becomes active when a relatively low voltage, direct current source is connected across the terminals + and —. Any other circuit arrangement which will provide similar results may also be used. It is believed that the operation of such oscillator circuit arrangement is so well known as to require no further description herein. The output windings of the various tone transmitters are connected in series to the carrier transmitter, as shown in FIG. 1, in order to provide modulation of the basic carrier frequency by each carrier tone. Obviously, only those carrier tones which are present at any one time are transmitted, modulated on the basic carrier current, over the communication channel. Modulation of the carrier current by these lower frequency carrier tones is well known and thus the apparatus has been shown conventionally. It is believed that this particular operation may be fully understood from this conventional illustration and brief description.

In the portable system which is illustrated here, the transmission of control functions is actuated by spring-return push buttons which may be mounted in a handset, the remainder of the apparatus such as the tone transmitters and carrier transmitter being carried in a convenient packset. For stationary control installations, the push buttons may be replaced by toggle switches or some form of movable levers. If desired, even in the portable handset toggle switches may be substituted for the push buttons here shown. A master control switch HSCB, also in the form of a spring-return push button, is provided with a hand grip lever to constitute a form of the well known deadman control feature. As will appear shortly, since this push button must be held constantly operated while the locomotive is moving, this arrangement protects against the operator stumbling or otherwise dropping the control handset at a critical time in the locomotive operation where a dangerous condition could result. It is obvious that the operation of this master control switch HSCB through pressure on the hand grip closes its normally open contacts a and b. The closing of contact a of this switch connects the positive terminal of battery CB to terminal + of the No. 3 tone transmitter. The — terminal of this transmitter is permanently connected to the negative terminal of the battery. This actuates the No. 3 tone transmitter to produce the No. 3 tone frequency. Closing of contact b of this master control switch energizes the power supply for the carrier transmitter and also relay PT. These two actions, including the closing of front contact a of relay PT, energize the carrier transmitter so that the basic carrier current modulated by the No. 3 tone is transmitted from antenna TA.

The brake control and sander control switches are similar type push buttons designated, respectively, BAPB and SPB. The operation of these two push buttons actuates the No. 4 and No. 5 tone transmitters, respectively, through the closing of contact a of the corresponding push button. In a similar manner to that previously described, the closing of contact b of either of these push buttons actuates the power supply and relay PT to energize the carrier transmitter. The direction of movement of the locomotive is controlled by the direction control push buttons FPB and RPB, selecting the forward and reverse directions, respectively. Preferably these two push buttons are interlocked so that only one may be operated at any one time. The closing of front contact a of either of these push buttons energizes the associated tone transmitter, here No. 6 and No. 7 tone transmitters, respectively. Again the closing of contact b of either of these push buttons energizes the power supply and relay PT to actuate the carrier transmitter, if not already actuated.

The control of the speed of the locomotive is obtained through speed control switches which differ from the previously discussed switches in that each is a push button having only one contact. The throttle advance push button TAPB controls, through the closing of its contact a, the No. 1 tone transmitter, while the throttle retard push button TRPB similarly controls the No. 2 tone transmitter. Since the locomotive cannot move unless master control switch HSCB is operated, so that its contact b is already closed to cause energization of the carrier transmitter, it is not necessary for the speed control push buttons to include contacts for this latter purpose. In the form of my invention here shown, speed is controlled by advancing or retarding the locomotive throttle one step at a time. Each tone pulse sent by an operation of push button TAPB or TRPB thus causes the throttle to advance or retard one step, respectively. In this manner, the speed of the locomotive is increased or decreased. A more complete operational description of this action will be given hereinafter.

Reviewing briefly, it is obvious from the description of the apparatus at the control location that each operation of a control switch or push button energizes the corresponding tone transmitter to transmit a tone pulse of that frequency over the communication channel established by the carrier transmitter. With the exception of the speed control switches, operation of any of the push buttons causes energization of the carrier transmitter to transmit the basic carrier frequency to carry the corresponding tone.

Turning now to the locomotive apparatus shown in FIG. 2, in the upper right of this drawing, conventionally illustrated, is a carrier receiver and its associated antenna LA. This receiver constitutes the other terminal of the space radio channel between the control location and the locomotive. When active, this carrier receiver is capable of receiving the basic carrier current transmitted from the control location and providing an output which includes any of the seven tones being transmitted from the control location at that time.

Across the top of the drawing are shown seven tone receivers, one for each tone transmitter at the control location. Each receiver has associated therewith a receiver relay designated by the character R with a numeral suffix corresponding to the tone designation. A typical circuit for such a receiver unit is shown in FIG. 2a. This receiver comprises filter circuits to select only the corresponding tone frequency. The output from the transformer winding, through a full wave rectifier, thus energizes the relay RN only when current of the corresponding selected tone frequency is being received. Operation of this circuit is well known and it is to be understood that other circuits may satisfactorily be used. It is herein considered necessary only to understand that, when the tone frequency is transmitted over the carrier circuit from the control location and received at the locomotive, it is selectively received by the corresponding tone receiver and the corresponding receiver relay energized. In the event that an inductive carrier channel is used between control location and locomotive, certain modifications in the carrier receiver are necessary but these are well known and conventional.

The locomotive apparatus receives energy from the locomotive battery represented by the battery LB shown in the upper left of FIG. 2. The changeover switch CHSW is provided for selection between manual operation of the locomotive in the usual manner and remote operation. When switch CHSW is in its left hand or manual (M) position, in which it is illustrated, battery energy is supplied through the usual circuits so that a normal crew may operate the locomotive with the standard controls. When switch CHSW is moved to its right hand or remote (R) position, the battery terminals are connected to and energize the terminals designated by the reference characters B and N, respectively. When these references appear elsewhere in the circuits of FIG. 2, they represent a connection to these terminals B and N which, in turn, over switch CHSW in its R position, connect respectively to the positive and negative terminals of battery LB.

Simple or basic type control is illustrated by the control exercised on the sander magnet SM. When carrier tone 5 is received through the carrier receiver, relay R5 is energized and picks up. The closing of front contact a of this relay energizes sander magnet SM, which then in turn operates a valve in the normal manner to cause the application of sand to the rails at the wheels of the locomotive. The actual control of the valve by the sander magnet to cause the sanding action, and similar controls by other magnets to be discussed hereinafter, are not shown in detail since such controls are conventional on locomotives and do not form any part of my invention.

The energization of relays R6 and R7, when carrier tones 6 and 7, respectively, are received, causes the energization, respectively, of direction relays F and R. It will be remembered that the transmission of carrier tones 6 and 7 is actuated at the control location by the direction control push buttons in a manner that only one of these tones may be transmitted at a time. Each of relays F and R is provided with a stick circuit that includes its own front contact a and back contact a of the opposite receiver relay. For example, if carrier tone 6 is received, and relay R6 thus picked up, relay F is energized by an obvious circuit including front contact a of relay R6. When relay F picks up, the closing of its own front contact a completes the stick circuit further including back contact a of relay R7. Equivalent circuits may be traced for relay R. Relays F and R together control the locomotive direction controller magnets, magnet FM for the forward direction and magnet RM for the reverse direction. Circuits for these magnets check that only one of the direction relays is picked up. For example, the circuit for forward magnet FM may be traced from terminal B over back contact b of relay R, front contact b of relay F, and the winding of magnet FM to terminal N. A similar circuit for reverse magnet RM includes back contact b of relay F and front contact b of relay R. Magnets FM and RM control master connections which determine the direction of locomotive movement. Again these controls are not shown because they form no part of my invention and are conventional for all locomotives, whether operated by remote control or under manual control of the crew.

The brake application magnet BM is controlled by receiver relays R3 and R4 which are obviously responsive to the reception of carrier tones 3 and 4, respectively. It is here assumed that brake magnet BM, when energized, causes the release of the locomotive brakes and, conversely, if deenergized causes an immediate application of the locomotive brakes to slow or halt locomotive movement. Thus, any fault in the control circuit for magnet BM causes a fail-safe condition in which the locomotive brakes are applied. The circuit for magnet BM may be traced from terminal B over front contact *a* of relay R3, back contact *a* of relay R4, and the winding of the magnet to terminal N. It is obvious that if carrier tone 4 is received so that back contact *a* of relay R4 opens, the locomotive brakes are applied. In addition, lack of reception, i.e., absence, of carrier tone 3, due to the release of the dead-man control switch HSCB at the control location or to a transmission fault, also interrupts this circuit and causes the release of brake magnet BM to apply the locomotive brakes. Release of relay R3, due to the absence of carrier tone 3, also has other applications which will be discussed shortly. It is obvious, however, that locomotive brakes are held released only if carrier tone 3 is received at the locomotive and carrier tone 4 is not received.

Receiver relays R1 and R2 together control the operation of a reversible stepping switch SS. In other words, these relays control the forward and back movement, or the advance and return, of the contact arms of this stepping switch. This control is accomplished through two stepping switch windings, SADV for advancing the switch arms and SRTD for retarding or returning the switch arms to a lower position. Through stepping switch SS, relays R1 and R2 control the locomotive throttle controller which in turn controls the actual speed of the locomotive. The throttle controller is supplied by the locomotive builder and is shown in a conventional manner as including three magnet windings T1, T2, and T3, which are enclosed within the conventional dot-dash rectangle representing the controller apparatus. The energized combination of these magnet windings determines the actual speed of the locomotive in either direction of movement. This control is not shown in detail since again it is not a part of my invention and is conventional for such locomotives.

Stepping switch SS, which is of the reversible type, is shown conventionally by a dot-dash rectangle designated by the reference character SS. This stepping switch is shown as having five contact levels *a, b, c, d,* and *e*, each of which includes a wiper or contact arm designated by the contact level reference character and eight contact points. Since all contact arms of the stepping switch are in the same position at all times, the contact points are designated only in the uppermost level by the numerals 0 to 7, inclusive. Contact 0 is considered the home or off position of switch SS. The circuit established by the contact arm at each level at any time is to the same numbered contact point as in each of the other contact levels. The switch advance winding SADV is controlled by the circuit including front contact *a* of relay R1. Each time this contact *a* closes to energize winding SADV, stepping switch SS operates to advance each contact arm to the next higher numbered contact position. Similarly, the return or retard winding SRTD is controlled normally by a circuit including front contact *a* of relay R2. Each time winding SRTD is energized by the closing of this contact, the contact arms of all levels are moved to the next lowered numbered contact position. In other words, winding SADV controls the stepping of the switch in the forward or clockwise direction while winding SRTD controls the stepping of the switch in the back or counterclockwise direction.

Winding SRTD is also controlled over contacts in the lowest level and self-stepping contact 10 of the switch, the circuit further including back contact *a* of relay R3. If this circuit is completed by the closing of back contact *a* of relay R3, when contact arm *e* of the stepping switch is any position other than its home position, winding SRTD is energized to step the switch in the counterclockwise direction. Each movement of the switch to the next lower numbered position causes the opening of contact 10 to deenergize winding SRTD. This in turn recloses contact 10 to cause another stepping action of the switch. It is obvious, therefore, that the closing of back contact *a* of relay R3 will cause stepping switch SS to return in the reverse direction to its home position. The utility of this action will be more fully discussed hereinafter.

The only remaining item of apparatus on the locomotive is the line contactor relay LC, shown in the lower left. This relay is energized when either of the direction relays F, R is energized and stepping switch SS is in any position other than its home position. The energizing circuit arrangement may be traced from terminal B over back contact *c* of relay R and front contact *c* of relay F, or front contact *c* of relay R and back contact *c* of relay F, thence over contact arm *d* and any of the contacts 1 to 7 of contact level *d* of switch SS, and the winding of relay LC to terminal N. When relay LC, thus energized, picks up and closes its front contact *a*, energy is supplied to the locomotive line contactors, only the portion of this circuit which includes the contact of relay LC being shown. These contactors must be energized to permit operation of the locomotive. This occurs, as is obvious, when a direction of movement of the locomotive has been selected and at least one step advance has been made by stepping switch SS.

It is to be noted that throttle controller magnets T1, T2, and T3 are controlled, respectively, over contact levels *a, b,* and *c* of switch SS. The magnets are energized in various combinations in accordance with the position of the contact arms *a, b,* and *c* of switch SS. For example, a circuit may be traced for magnet T1 which includes contact arm *a* and contact 2 of the corresponding level of switch SS and the winding of magnet T1. An examination of this circuit arrangement indicates that, in this position of the stepping switch, only magnet T1 can be energized. Similar examination will show that magnet T2 only is energized if the stepping switch is in position 3. However, magnets T1 and T2 are both energized with switch SS in position 4 while magnet T3 alone is energized with the switch in position 5. Position 6 causes the energization of magnets T2 and T3 and all three magnets are energized with stepping switch SS in position 7. The magnets remain deenergized with the stepping switch in its home position or in position 1. Thus, the various speeds of which the locomotive is capable may be selected in the various positions of stepping switch SS by varying the energized combination of the throttle control magnets.

I shall now describe briefly how the system shown in FIGS. 1 and 2 operates in the control of the locomotive. When it is desired to remotely control a locomotive supplied with this apparatus, switch CHSW on the locomotive is positioned to its R position, to energize terminals B and N of the apparatus. It is to be noted that this energizes, through permanent connections to these terminals, the carrier receiver on the locomotive to enable it to receive carrier current transmitted from the remote control location. The operator then depresses or actuates master control switch HSCB on his control set. Closing of contact *b* of this push button energizes relay PT and the power supply of the control apparatus. This in turn activates the carrier transmitter so that transmission of the basic carrier current over the communication channel begins. In addition, the closing of contact *a* of switch HSCB activates tone transmitter No. 3 so that the carrier tone 3 is transmitted over the communication channel as a modulation of the basic carrier current. The No. 3 tone receiver is activated by this transmission and relay R3 on the locomotive is thus energized and picks up. The opening of back contact *a* of relay R3 interrupts the connection to terminal B from self stepping contact 10 of switch SS. The closing of front contact *a* of relay R3 energizes brake magnet BM to release the locomotive brakes.

The operator now actuates push button TAPB to transmit a pulse of carrier tone 1 to the locomotive. Relay R1 picks up and then releases as the pulse is received and terminates. The closing of front contact *a* of relay R1 energizes winding SADV of switch SS, causing this switch to step all its contact arms to position 1. At the same time, or previously, the operator actuates push button FPB, assuming that he desires a forward movement of the locomotive. This transmits a pulse of carrier tone 6 from his control location to the locomotive. Relay R6 is energized and picks up, closing its front contact *a* to energize relay F. This relay picks up and completes its stick circuit which includes back contact *a* of relay R7, checking that only one of the direction carrier tones has been transmitted. The closing of front contact *b* of relay F energizes forward direction magnet FM, this circuit having been previously traced. The closing of front contact *c* of relay F completes the circuit, further including contact arm *d* and the corresponding No. 1 contact of switch SS, to energize relay LC. This closes the circuit to energize the locomotive line contactors permitting the locomotive engine to start. If the operator desired a reverse movement of the locomotive, push button RPB would have been actuated to transmit carrier tone 7, energizing relays R7 and R on the locomotive. In turn, reverse magnet RM would have been energized while the closing of front contact *c* of relay R completes the alternate circuit for energizing relay LC so that the locomotive engine can start.

Assuming that the operator maintains switch HSCB operated by gripping the operating handle, he can further actuate push button TAPB to advance the throttle of the locomotive. This second operation of push button TAPB causes stepping switch SS to move to position 2. As previously traced, this energizes throttle magnet T1 to initiate a movement of the locomotive. Further operations of push button TAPB by the operator can cause an increase in the locomotive speed in its forward direction, as magnets T1, T2 and T3 are energized in various combinations. Push button TAPB does not have to be held actuated since it is the pulsing of switch SS which causes the change in locomotive speed. When the operator desires to reduce the speed of the locomotive, push button TRPB is actuated to transmit a pulse of carrier tone 2. This energizes relay R2 on the locomotive which in turn energizes winding SRTD of switch SS to cause the contact arms to step in the counterclockwise direction.

In the event that an application of sand to the rails is required to prevent wheel slip, the operator actuates push button SPB, causing the transmission of carrier tone 5. This in turn energizes relay R5, and thus sander magnet SM, to cause an application of sand to the rails. The operator can at any time apply the locomotive brakes by an operation of push button BAPB on his hand set. This causes the energization of relay R4 on the locomotive, thus interrupting the circuit for magnet BM which releases to cause the brake application. Preferably, of course, the locomotive throttle will have been retarded to its off position, that is, all magnets released, prior to this occasion but this is not necessary for brake application.

It is obvious that the operator must hold switch HSCB closed in order to continue locomotive movement. If he inadvertently releases this switch, or purposely releases it, the transmission of carrier tone 3 is halted, causing relay R3 on the locomotive to immediately release. An equipment fault or channel interruption may also cause relay R3 to release, together with a loss of control of the locomotive. The opening of front contact *a* of relay R3 interrupts the circuit for brake magnet BM causing a brake application. The closing of the associated back contact *a* completes a circuit through self stepping contact 10 of switch SS to winding SRTD of this switch. The contact arms of the switch are immediately stepped in the counterclockwise or reverse direction to the off position. Thus the locomotive speed is rapidly reduced to zero and, on the final step, the engine is shut off. Meanwhile, the locomotive brakes are applied to stop its further movement. It is obvious that, with this safety feature, any mishap to the operator, who is in some position away from the locomotive, or loss of control due to a fault, will cause the locomotive to be brought quickly to a halt.

The system of my invention as described thus provides an arrangement by which a remotely located operator can control the operation of a locomotive through the proper operation of the various control switches under his control. He may start up the locomotive engine, select a direction of movement, increase or decrease the locomotive speed at his desire, and can release or apply the locomotive brakes as is necessary in the operation. In addition to this, various minor controls such as rail sanding and locomotive bell and whistle operation may be accomplished as desired. In the portable system, which is actually illustrated, the operator, while retaining control of the locomotive but working at some position away from the locomotive, can perform such related functions as positioning the track switches for car switching, coupling and uncoupling cars to be moved by the locomotive, and other such operations as may be pertinent to the job being performed. This may be accomplished with complete safety due to the dead-man control feature provided as part of the arrangement. The crew necessary for the operation of the locomotive and its switching procedures is thus reduced to one man who is capable of accomplishing the complete and desired operation.

Although I have herein shown and described but one form of remote control system for a locomotive embodying my invention, it is to be understood that various changes and modifications may be made therein within the scope of the appended claims without departing from the spirit and scope of my invention.

Having thus described my invention, what I claim is:

1. A remote speed control system for a locomotive, comprising, a communication means for transmitting different signals from a remote control station to a locomotive; a first, a second, and a third transmitter at said station, each capable of generating a distinctive tone signal when actuated and connected to said communication means for transmission of that signal; a first and a second control function selector for momentarily selectively actuating said first and second transmitters; a first, a second, and a third receiver at said locomotive having connections to said communication means for detecting the tone signals from the corresponding transmitters; speed control means controlled by said first and said second receivers for respectively increasing and decreasing the locomotive speed by increasing and decreasing the applied power between the zero and a maximum as first and second transmitter tone signals are received, control means having connections when operated for continuously actuating said third transmitter, and a control connection between said third receiver and said speed control means and responsive to said third receiver for overriding the control of said first and second receivers and immediately decreasing the locomotive speed to zero when absence of the third transmitter tone signal is detected.

2. A remote speed control system for a locomotive, comprising, a communication means for transmitting different signals from a remote control station to a locomotive; a first, a second, a third, and a fourth transmitter at said station, each capable of generating a distinctive tone signal when actuated and connected to said communication means for transmission of that tone; a first, a second, and a third control function selector for selectively actuating said first, second, and third transmitters; a first, a second, a third, and a fourth receiver at said locomotive having connections to said communication means for detecting the tone signals from the corresponding transmitters; speed control means controlled by said first and said second receivers for respectively increasing and decreasing the locomotive speed by increasing and decreasing the applied power between zero and a maximum as momentary first and second transmitter tone signals are received, brake control apparatus controlled by said third receiver for actuating a locomotive brake application when third transmitter tone signals are received, control means having connections when operated for continuously actuating said fourth transmitter, a control connection between said fourth receiver and said speed control means and responsive to said fourth receiver for overriding the control of said first and second receivers and immediately decreasing the locomotive speed to zero when absence of the fourth transmitter tone signal is detected, and another control connection supplementing the control of said brake apparatus by said third receiver and controlled by said fourth receiver for actuating a locomotive brake application when absence of said fourth transmitter tone signal is detected.

3. A remote speed control system for a locomotive, comprising, a carrier transmission channel between a control location and the locomotive capable of transmitting tone signals; a first, a second, and a third transmitter at said control location, each generating a distinctive tone signal when actuated and connected to said channel for transmission of the signal; a first and a second selector operable for momentarily selectively actuating said first and said second transmitter respectively, a master switch operable to continuously actuate said third transmitter, a first and a second receiver unit having connections to said channel at said locomotive and responsive to the transmission of each first and second tone signal respectively to momentarily close a contact, a third receiver unit at said locomotive having connections to said channel and responsive to the reception of the third tone signal to open a normally closed contact, a stepping switch having a plurality of positions and a first operating circuit arrangement therefor controlled by the first and second receiver unit contacts to step said stepping switch forward or back to the adjacent position as said first or said second receiver unit contact respectively momentarily closes, a control circuit for the locomotive throttle controlled by said stepping switch to operate the throttle to a selected speed condition in accordance with the existing position of said stepping switch, whereby the locomotive speed may be increased and decreased by increasing and decreasing the applied power between zero and a maximum as first and second transmitter tone signals are received, and a second operating circuit for said stepping switch controlled by said third receiver unit contact to successively step said stepping switch to its off position to halt the locomotive when said third receive unit contact closes.

4. A locomotive remote control system comprising in combination, a transmission means for transmitting a plurality of different signals from a control location to a locomotive, a plurality of transmitters, each capable of generating a distinctive signal and having connections to said transmission means for effecting the transmission of that signal, a function selector means associated with each transmitter and having connections for initiating when actuated the generation of the transmitter signal, a receiving means at said locomotive responsive to said transmission means for receiving said plurality of signals, a plurality of receivers at said locomotive, one corresponding to each of said transmitters, each having connections to said receiving means for registering the reception of the corresponding signal, a first function control means controlled by a first pair of said receivers for increasing or decreasing the selected locomotive speed by increasing and decreasing the applied power between zero and a maximum as the one or the other respectively of said first pair of receivers registers the reception of the corresponding signal, a second function control means controlled by a second pair of said receivers for selecting forward or reverse movement of said locomotive as the one or the other respectively of said second pair of receivers registers the reception of the corresponding signal, a third function control means controlled by a third pair of said receivers for releasing the locomotive brakes when one of said third pair of receivers registers the continuous reception of the corresponding signal and the other receiver of said third pair registers the absence of the corresponding signal, said other receiver of said third pair having connections for effecting a brake application when the reception of the corresponding signal is registered, said one receiver of said third pair having connections to said first function control means for overriding control by said first pair of receivers and for decreasing the locomotive speed to zero when an absence of the corresponding signal is registered.

5. A locomotive remote control system comprising in combination, a transmission means for transmitting a plurality of different signals from a control location to a locomotive, a plurality of transmitters, each capable of generating a distinctive signal and having connections to said transmission means for effecting the transmission of that signal, a manually operable master switch adapted to be continuously actuated by a control operator and having connections to a particular transmitter for continuously generating the corresponding distinct signal, a function selector means associated with each other transmitter and having connections for initiating when actuated the generation of the transmitter signal, a receiving means at said locomotive responsive to said transmission means for receiving said plurality of signals, a plurality of receivers at said locomotive, one corresponding to each of said transmitters, each having connections to said receiving means for registering the reception of the corresponding signal, a first function control means controlled by a first pair of said receivers for increasing or decreasing the selected locomotive speed by increasing and decreasing the applied power between zero and a maximum as the one or the other respectively of said first pair of receivers registers the reception of the corresponding signal, a second function control means controlled by a second pair of said receivers for selecting forward or reverse movement of said locomotive as the one or the other respectively of said second pair of receivers registers the reception of the corresponding signal, a third function control means controlled by a third pair of said receivers for releasing the locomotive brakes when one of said third pair of receivers registers the continuous reception of the distinct signal from said particular transmitter and the other receiver of said third pair registers the absence of the corresponding signal, said other receiver of said third pair having connections for effecting a brake application when the reception of the corresponding signal is registered, said one receiver of said third pair having connections to said first function control means for overriding control by said first pair of receivers and for decreasing the locomotive speed to zero when the absence of the distinct signal from said particular transmitter is registered.

6. A remote movement control system for a locomotive comprising, a transmission means for transmitting a plurality of different signals from a remote control station to a locomotive; a first, a second, and a third pair of transmitters, each transmitter being capable of generating a distinctive signal when actuated and having connections to said transmission means for effecting transmission of that signal; a first pair of selectors having connections for momentarily actuating one or the other of said first pair of transmitters as an increase or decrease in locomotive speed respectively is selected, a second pair of selectors having connections for momentarily actuating one or the other of said second pair of transmitters as forward or reverse locomotive movement respectively is selected, a third pair of selectors having connections for continuously actuating a preselected one of said third pair of transmitters to effect remote control of said locomotive and for actuating the other of said third pair of transmitters when a brake application control is selected, a receiving means at said locomotive responsive to said transmission means for receiving said plurality of signals; a first, a second, and a third pair of receivers, each receiver having connections to said receiving means for registering the signal from the corresponding transmitter at said control station; a first function control means controlled by said first pair of receivers for increasing and decreasing the locomotive speed by increasing and decreasing the applied power between zero and a maximum as one or the other respectively of said first pair of receivers registers the reception of a momentary signal, a second function control means controlled by said second pair of receivers for establishing forward and reverse movement of said locomotive as one or the other respectively of said second pair of receivers registers the reception of a momentary signal, and a third function control means controlled by said third pair of receivers for retaining the locomotive brakes released only as the one receiver of said third pair registers the reception of a continuous signal and the other receiver registers the absence of signal reception, said one receiver of said third pair having other connections to said first function control means for reducing the locomotive speed to zero when the absence of signal reception is registered.

References Cited in the file of this patent

UNITED STATES PATENTS

| | | |
|---|---|---|
| 1,816,628 | Williams et al. | July 28, 1931 |
| 2,769,601 | Hagopion et al. | Nov. 6, 1956 |
| 2,780,300 | Beyer | Feb. 5, 1957 |
| 2,832,426 | Seargeant | Apr. 29, 1958 |
| 2,948,234 | Hughson | Aug. 9, 1960 |
| 2,951,452 | Karlet | Sept. 6, 1960 |